(12) United States Patent
Nadji et al.

(10) Patent No.: US 9,398,635 B1
(45) Date of Patent: Jul. 19, 2016

(54) SYNCHRONOUS ADAPTIVE RADIO SELECTION

(75) Inventors: Behzad Nadji, Los Gatos, CA (US); Mostafa Tofighbakhsh, Cupertino, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 2088 days.

(21) Appl. No.: 11/314,096

(22) Filed: Dec. 22, 2005

(51) Int. Cl.
   *H04W 80/06* (2009.01)
(52) U.S. Cl.
   CPC .................................... *H04W 80/06* (2013.01)
(58) Field of Classification Search
   CPC . H04L 65/403; H04L 43/0894; H04L 43/106; G06Q 30/0601; H04N 7/187; G06F 17/30595; G06F 17/30575; G09B 9/08; H04W 72/1215; H04W 24/10
   USPC ............... 370/328, 310, 419; 455/557, 422.1, 455/435.1; 340/425.5; 709/220, 224; 379/201.01; 715/736
   See application file for complete search history.

(56) References Cited

U.S. PATENT DOCUMENTS

| | | | |
|---|---|---|---|
| 5,410,753 A | 4/1995 | Szabo | |
| 5,481,588 A | 1/1996 | Rickli et al. | |
| 6,219,544 B1 * | 4/2001 | Suutarinen | 455/423 |
| 6,308,065 B1 | 10/2001 | Molinari et al. | |
| 6,430,397 B1 * | 8/2002 | Willrett | 455/67.11 |
| 6,662,008 B1 * | 12/2003 | Dolan et al. | 455/423 |

* cited by examiner

*Primary Examiner* — Phuoc H Doan
(74) *Attorney, Agent, or Firm* — Hartman & Citrin LLC

(57) ABSTRACT

A method for synchronously adapting radio frequency channel selection based on an application which can range from low bandwidth applications such as instant messaging to high bandwidth applications such as streaming video selected by an end user cellular telecommunications device involves providing end user devices with synchronous adaptive radio selection (SARS) modules. The SARS modules perform as sensory agents for identifying usage by the end user device of applications and thus permit monitoring for interference, congestion and the like in the cellular telecommunications network. The sensory agents preferably determine their location and altitude for comparison with reference topographic relief maps of a geographic area surrounding a base station. Control reference test stations collect information from the sensory agents and further receive updates on security alerts and network administration policies from a base station, for example, equipped with a base station scheduler. The reference test stations periodically output channel control information including a reference clock frequency, its identity, interference levels, policies and security updates for the base stations and end user devices to optimize radio frequency selection based on utilized applications. Consequently, the control reference stations oversee channel characteristics in a centralized manner and provide guidelines to base stations for optimized traffic flows and altimetry enhanced application performance.

21 Claims, 4 Drawing Sheets

SYNCHRONOUS ADAPTIVE RADIO SELECTION

BACKGROUND OF THE INVENTION

The field of the present invention is directed to mobile telecommunications services and, in particular, to a method and apparatus for providing improved and adaptive radio frequency selection utilizing reference test stations and equipping user devices with synchronous adaptive radio selection modules.

The use of test stations in mobile and, in particular, cellular telecommunications systems is known, for example from U.S. Pat. Nos. 5,410,753; 6,219,544; 6,308,065 and 6,430,397. These patents generally described fixed or mobile test station apparatus that may additionally, in one embodiment, be wired to a base station rather than permitted merely to receive and transmit signals via wireless or radio frequency means. Clearly, mobile apparatus may have the additional feature of GPS or global positioning or may be located by base stations utilizing triangulation techniques whereby the mobile location of the mobile test station may be identified in geographic relation to one or more proximate transceiver base stations. The transmission quality within a cell may be monitored and parametric data collected including statistics directed to the location of a mobile at the time of data collection, the time of day and the radio frequencies and transmission reception levels of the signals. The collected data for directions of transmission to and from a base station may then be returned to a host operation and maintenance center where the data is processed and improvements to deficient parametric data planned for when compared with expected performance results.

Most cellular telecommunications applications today run over TCP. However, application performance may be enhanced if link layer information could be moved to higher levels of the OSI interconnect model and/or if network congestion could be minimized by providing bandwidth more appropriately suited to the application. Today, cellular phones are being utilized for the receipt and display of streaming video, for example, movies on demand applications requiring extremely high bandwidth at the same time as they are being utilized for instant messaging applications which require practically no bandwidth.

Notwithstanding the use of such known test stations and the improvements that may result from their use, there is still required a method and apparatus for, for example, optimizing use of both licensed and unlicensed radio frequency spectrum in both directions of transmission to and from a base station from an end user device during a real-time scenario where mobile traffic may be heavy in certain geographic areas surrounding a base station in relation to other base stations, i.e. a hot zone. In particular, the real-time problems that may require solution include but are not limited to congestion, radio frequency interference and enhanced wireless cost models for such high bandwidth requirement applications as streaming video. In particular, service level agreements impact the cost of the availability of certain frequencies for service provision and must be weighed against the real-time opportunity to utilize the available spectrum.

SUMMARY OF THE INVENTION

The above indicated problems of the prior art are solved if mobile telecommunications consumers and businesses are provided with the opportunity to elect synchronous adaptive radio selection (SARS). A SARS module may be provided with end user devices and, when enabled for a specific customer access network, the end user's device is listening every time interval for primary and secondary reference burst information on specific orthogonal frequency division multiplex (OFDM)/time division duplex (TDD) channels. The SARS module may be referred to herein as an agent and may comprise a part of an end user device that may be an edge device (at a border between base stations). The primary and secondary reference bursts from control reference stations, for example, may comprise a synch code word such that within the next interval is provided the bit indicator transmit TX or receive RX frequency maps that the devices may use in view of the real-time congestion/interference issues at the time among other data. The reference bursts sometimes referred to herein as channel control information are preferably optimized by reference or test stations as deployed in the vicinity of the base stations. Reference station control channels are multicast periodically, for example, every 200 milliseconds. The control channels for transmission may be preconfigured or set during registration of the stations (upon turn-on) and which are bound to the reference stations. The reference station control channel information is preferably synchronized with the redundant reference station for consistency and reliability. Exemplary data that may be contained in the control channel information includes but is not limited to the following: timing information, interference levels at various sub-channels, network level policies, route optimization updates, security directives and dynamic global network policies. The control reference stations may dynamically mitigate in real time around real time congestion due to traffic load in the vicinity of a given base station and interference, the addition or removal of a base station from service and other factors.

In one embodiment of a control reference station system, it is suggested to apply redundant reference bursts from at least two independent reference stations to guarantee that the end user stations not only stay in synch with respect to a master clock signal, but also switch to a best or preferred frequency (optimization model) dynamically. In effect, the given cellular telecommunications network, by utilizing the reference bursts from the reference stations, may manage an entire region as if via an airplane view of the geographic region rather than a localized view of the region as developed by test stations known from the prior art. One embodiment of the control reference station includes an altimeter for recording altitude which may be compared with similar base station altitude and a database containing a topographic relief map for comparison with sensory agent transmission data.

Following the principles of the invention, a cellular telecommunications network can expect better spectrum management and optimization, broadcast of interference and route information among base stations of the network, better spectrum utilization policy development among users and active applications, end-to-end synchronization reference clocks which enhance application performance and the enforcement of global network administration policies such as adaptive load balancing and adaptive security operational modes and directives.

These and other features of the present invention may be understood best from the drawings and the following detailed description of a preferred embodiment.

DETAILED DESCRIPTION OF THE DRAWINGS

Figure 1:
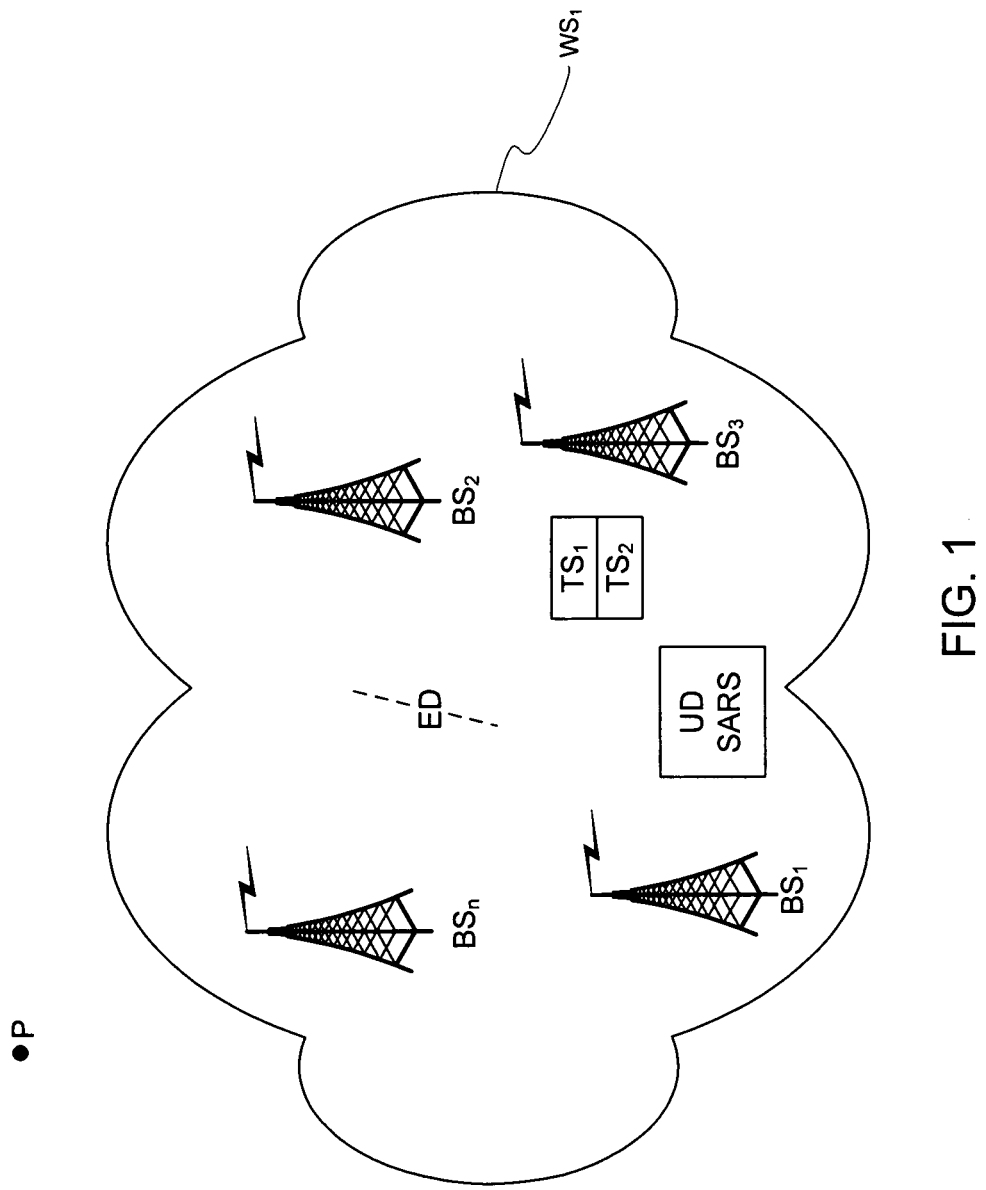
FIG. 1 provides an overview figure of a cellular telecommunications network $WS_1$ for defining certain terms associated with the present invention and introduces reference stations $TS_1$ and $TS_2$, a plurality of base stations $BS_1$ to $BS_n$, a user device UD equipped with a SARS module and a destination p for a telecommunications call from a user device to the destination.

Referring now to FIG. 1, FIG. 1 provides an overview figure of a cellular telecommunications network $WS_1$ for defining certain terms associated with the present invention and introduces control reference stations $TS_1$ and $TS_2$, a plurality of base stations $BS_1$ to $BS_n$, a user device UD equipped with a SARS module (of which there may be thousands in the vicinity of a given base station) and a destination p for a telecommunications call from a user device UD to the destination. $WS_1$ may, for example, comprise in the United States a representation of a network served by Cingular or Verizon Wireless or other wireless carrier. A second or third wireless network (not shown) such as a T-Mobile network may have overlapping boundaries with $WS_1$. User device UD which may be equipped with a SARS module according to the present invention actuates a registration mode with a nearby base station BS of the network $WS_1$ if it is contractually registered within $WS_1$.

The term hot zone will be used in this application to define an area surrounding a user device UD in which hot zone a number of other user devices are bidding for service with applications requiring varying bandwidth causing congestion and interference with respect to a nearby base station such as base stations $BS_1$ and $BS_2$. If the user devices and other terminal devices are equipped with synchronous adaptive radio selection modules according to the present invention, they will periodically receive and process control channel information transmitted from the reference test stations $TS_1$ and $TS_2$, for example, to synchronize clocks, adopt new network level policies and security directives as well as optimize route alternatives and frequency selections as they try to place a call to destination p. According to one embodiment of the present invention, the periodic interval may be on the order of every 100 milliseconds to every second, for example, every 200 milliseconds. As will be demonstrated by an understanding of FIG. 2, the transmitted control channel information is limited in content to predetermined length, requires little bandwidth and may be transmitted on specific orthogonal frequency division multiplex (OFDM)/time division duplex (TDD) channels determined for all reference stations. The reference stations may know their altitude in relation to sea level and so may base stations $BS_1$ to $BS_n$. Moreover, the reference stations and base stations may include altimeters for determining their respective altitudes and periodically transmitting their altitudes for comparison with a reference topographic relief map of a geographic region of wireless system 1 ($WS_1$).

Reference stations $TS_1$ and $TS_2$ are preferably redundant and may be fixed or mobile. If they are mobile, they are preferably equipped with global positioning system so that their locations at a particular time may be known to receiving base stations $BS_1$ to $BS_n$. Of course, triangulation may be used to locate mobile reference stations $TS_1$ and $TS_2$, but triangulation may not be as accurate as using global positioning. Reference stations $TS_1$ and $TS_2$ are adapted to collect and monitor signals transmitted from base stations $BS_1$ to $BS_n$ and from all user devices in their area. As such, the reference stations are capable of identifying hot zones, congestion and interference as information is transmitted by "agent" SARS devices and base stations. The reference stations continuously recalculate new control channel information for periodic broadcast/multicast based on information received from end user devices and base stations containing agent SARS modules. The term "broadcast" and "multicast" is used herein to define either transmission to all or to a group of end user devices because, for example, an end user device may receive control channel information as soon as it is powered up and prior to registration with a host network $WS_1$.

Sensory agents of the reference stations $TS_1$ and $TS_2$ are typically associated with end user devices and these end user devices may comprise laptop computers, so-called hand-held personal managers manufactured by, for example, PALM and Blackberry or simply cell phones equipped with SARS modules. These sensory agents periodically transmit signals for collection by the reference stations $TS_1$ and $TS_2$ in order for them in turn to monitor congestion, interference and so on according to the present invention via base stations $BS_1$ to $BS_n$. The sensory agents may also include altimeters and periodically indicate their altitude in comparison with reference topographic map data and their location (via GPS or triangulation). For example, in New York City, a mobile user's device equipped with a SARS module may be on the fiftieth floor of a skyscraper building while, according to a GPS locator, another device with a proximate GPS location reading may be located twenty or fifty floors below according to reference topographic map data that may be centrally located in a $WS_1$ network database (not specifically shown in FIG. 1 but located within cloud $WS_1$) that may include skyscraper and other topographic data. In one embodiment of the present invention, reference stations $TS_1$ and $TS_2$ are not collocated with base stations $BS_1$ to $BS_n$ but contain, as described above, altimeters for determining altitude above sea level. $TS_1$ and $TS_2$ may be mobile and contain latitude and longitude location determining devices as well as weather monitoring devices; (precipitation, for example, may adversely effect tranception). $TS_1$ and $TS_2$ preferably are located at boundaries or edges as edge devices ED (shown at edge or border between $BS_n$ and $BS_2$) and at a sufficient altitude to complement the activities of base stations $BS_1$ to $BS_n$ including the receipt and retransmission of network and security policies and updates and allocated frequency maps for applications or be hard-wired to proximate base stations, for example, $BS_3$.

Figure 2:
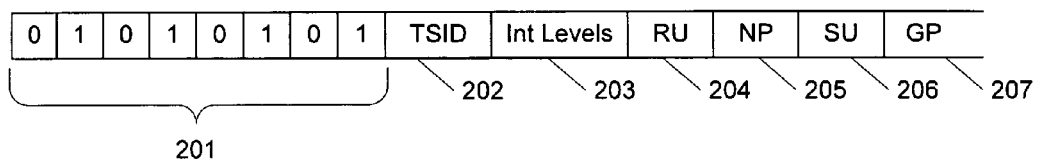
FIG. 2 provides an exemplary representation of control channel information in the form of a synch code word and data including frequency maps of licensed and unlicensed spectrum which is periodically sent for user end devices to use based on data collected from the reference stations $TS_1$ and $TS_2$ of FIG. 1.

FIG. 2 provides an exemplary representation of control channel information in the form of a synch code word and data including frequency maps of licensed and unlicensed spectrum which is periodically sent for user end devices to use based on data collected from the reference stations $TS_1$ and $TS_2$ of FIG. 1. According to one embodiment of the present invention, specific orthogonal frequency division multiplex (OFDM)/time division duplex (TDD) channels are allocated for the SARS control channel information transmission. The order of data within the control channel information is not important to the present invention but, typically, a frequency burst 201 begins a synch code word, typically of alternating binary data which frequency may be compared against a reference clock maintained by the receiving user device UD. The reference clock may be delayed due to real time delay between transmissions from the reference stations whose locations are known to the user devices from their identity 202. The identity or address TSID 202 of the reference test stations may be used in a station look-up table to uniquely identify its location and altitude and by an end station to calculate an absolute delay between the transmission and reception at a location of the user device UD so that the reference clock may be adjusted accordingly.

Following the identity of the reference station, there may be provided an indication of interference levels at various sub-channels 203 in the control channel information. The interference levels may be utilized for optimizing RF channel/sub-channel selection. Moreover, route optimization updates RU 204 may be immediately transmitted by the reference stations following the interference level indications. Licensed and unlicensed spectrum is considered for allocation. For example, a given base station BS may determine a hot zone that is quite proximate to the base station and, consequently, suggest that end user devices in the vicinity of the hot zone use unlicensed, short distance radio frequencies such as cordless frequencies for use by an end user device UD in a hot zone.

Following the interference levels, the control channel information may include network level policies NP 205 which are relayed by the reference stations $TS_1$ and $TS_2$ as received from a network administration controller not shown in FIG. 1. Similarly, security updates SU 206 may be transmitted following the network level policies. Also, dynamic global network policies GP 207 may be transmitted to the user devices UD as soon as the network administration controller actuates such policies.

Not shown in FIG. 2 are other fields of data that may come to mind of one of ordinary skill in the art from an understanding of the above description of FIGS. 1 and 2. For example, it may be useful for reference stations to transmit their locations rather than for end user devices to utilize a look-up table entered via a reference station identity or address or their altitudes as determined by an altimeter. Moreover, the route optimization data may include cost model data for frequency so that an end user device may choose a transmit frequency based on cost. A user device may effect real-time changes in frequency utilization, network policy, security alert adaptation and the like as frequently as it receives control channel information from the reference stations.

Figure 3:
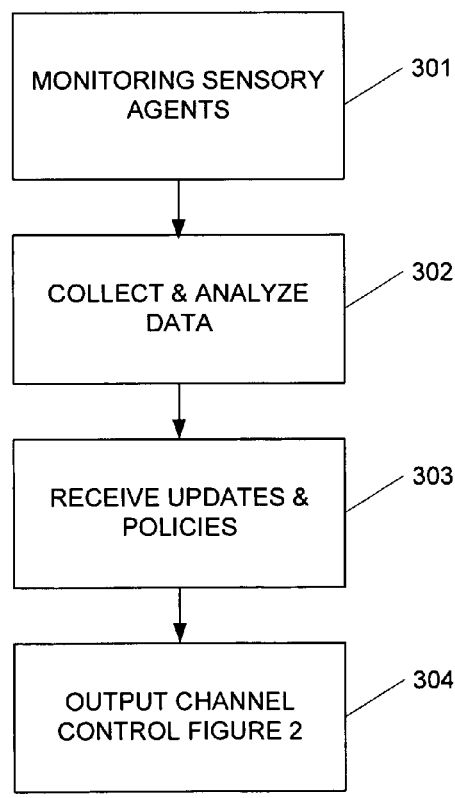
FIG. 3 provides an overview flowchart of activities at a reference station in accordance with the present invention for collecting information and broadcasting the reference burst and control channel information.

FIG. 3 provides an overview flowchart for the reference test station TS activities of first monitoring sensory agents 301. A sensory agent SARS device acts as an exemplary subject for study and analysis by the base station BS and the reference station TS and may request varying bandwidth requirements and be applied in varying ways over time by the end user. In connection with monitoring sensory agents, the next step 302 is to collect and analyze collected data to determine hot zones, congestion, interference and the like from base stations $BS_1$ to $BS_n$ and sensory agents. Also, the test stations $TS_1$ and $TS_2$ monitor for reception of new security updates and network administration policies 303 from a network administration controller for wireless system $WS_1$ not shown. The base station $BS_1$ to $BS_n$, in one embodiment, may be equipped with a base station scheduler for acting on the reference station control channel information of FIG. 2 and therefore, improved channel bandwidth allocation may result that is application dependent, i.e. the bandwidth usage extreme applications of instant messaging versus video streaming. The reference test station TS may adapt in real time to a base station BS that may be removed from service for whatever reason or one that has been just cut over to service. Finally, with input from a single central clock source, the test stations $TS_1$ and $TS_2$ perform the final step of outputting channel control information 304 in accordance with FIG. 2 including the clock source as a frequency burst 201 and other information.

Figure 4:
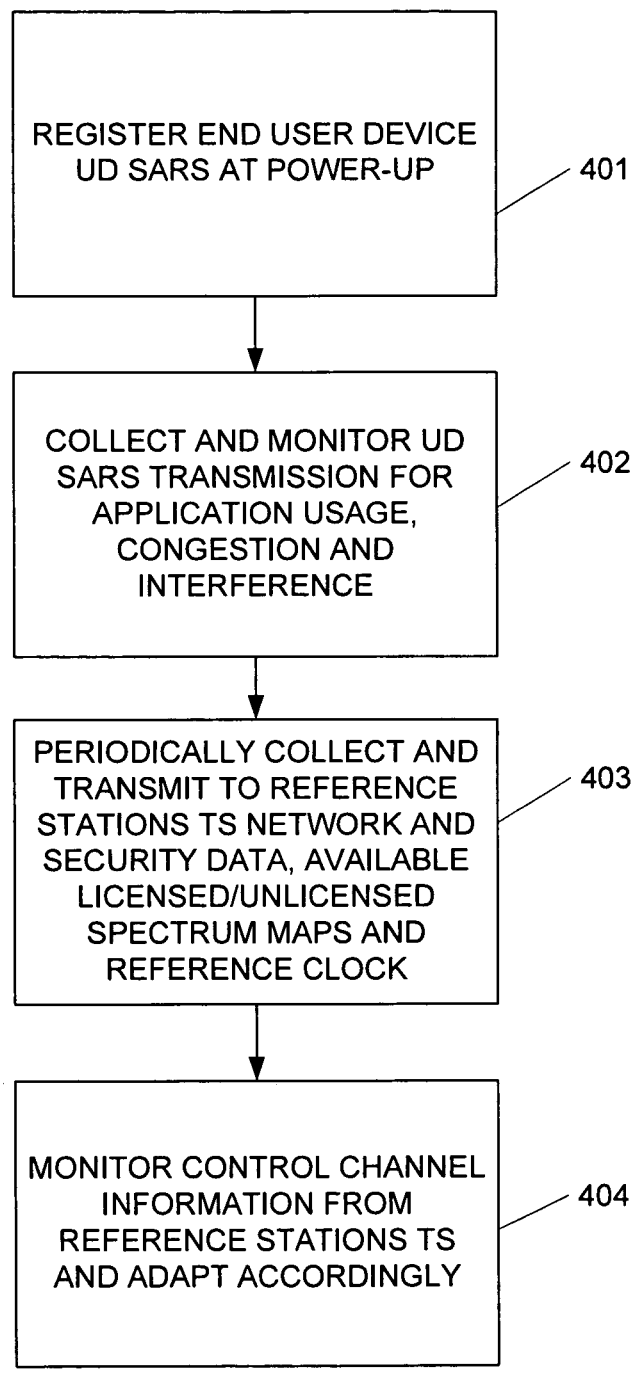
FIG. 4 provides an overview flowchart of activities at a base station $BS_1$ to $BS_n$ of FIG. 1 for communicating with user devices, at least one base station being proximate to, collocated with or communicating with a network administration controller, not shown.

FIG. 4 provides an overview flowchart for the base station BS activities in relation to reference test stations and end user devices equipped with SARS modules according to the present invention. As with FIG. 3, the steps need not be performed in the order indicated in the figure. In step 401, the base station BS receives a registration signal from a plurality of end user devices within its reception territory as each device powers up. In step 402, the base station collects and monitors the user devices with SARS modules transmissions shortly after registration for application usage, congestion and interference in order to identify hot zones and develop frequency and interference data accordingly. At step 403, the base station periodically collects and transmits to reference stations $TS_1$ and $TS_2$ network and security data, available licensed and unlicensed radio frequency spectrum data and reference clock. At step 404, the base station BS may also monitor for transmissions of control channel information from redundant reference test stations $TS_1$ and $TS_2$, for example, to provide the base station BS with feedback as to successfully received, for example, route optimization, security and network policy data at the reference stations.

Figure 5:
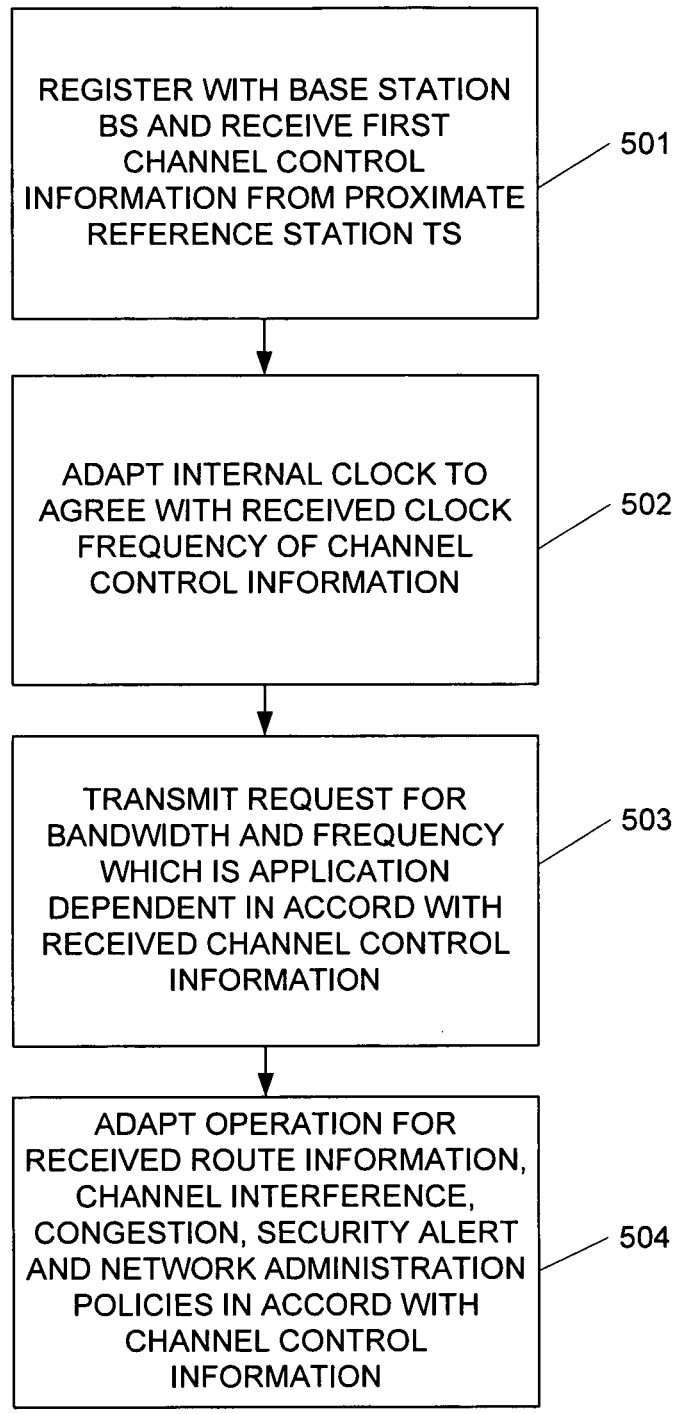
FIG. 5 provides an overview flowchart of activities at an end user station, UD SARS, equipped with a SARS module per FIG. 1 from the time of turn on and registration with the network $WS_1$ and receiving control channel information periodically of FIG. 2 as well as communicating with a proximate base station $BS_1$ to $BS_n$.

FIG. 5 provides an overview of activities at an end user device equipped with a SARS module. Again, the order of the steps shown in FIG. 5 is not significant, i.e. that the steps be performed in the order given, nor is the order of any sub-steps. For example, at step 501, the end user device UD, preferably equipped with a SARS module for receiving control channel information from a reference test station TS, registers with a base station BS at power up. Once an end user device is powered it may receive channel control information from proximate base stations BS first or register first or do both simultaneously. At step 502, the end user device UD, having received control channel information and the reference clock signal as a frequency burst 201 may adapt its internal clock to agree with system clock frequency received from the control channel information in accordance with well-known practices. At step 503, the end user device requests bandwidth for a user input application selection. The application selected by the user may involve communication of instant messaging having a low bandwidth requirement, an application requiring an intermediate bandwidth requirement such as voice communication, large file transfer such as camera images or receipt of streaming or downloaded video in response to a request for a movie entered by the user. At step 504, the end user device UD adapts its behavior depending on the channel control information received from reference test stations TS, for example, route information, channel interference information, congestion, security alert, network administration policies and the like. The end user device UD may be moving during the call and a base station BS may go out of service or be added to service. Consequently, a mobile end user device UD with the SARS module may immediately adapt to changing conditions, even altitude changes, if it is equipped according to one embodiment, with an altimeter.

Thus, there has been shown and described a novel method for synchronous adaptive radio selection which solves the problems of prior art test stations and provides the advantages sought. The present invention should only be deemed to be limited by the scope of the claims which follow.

What we claim is:

1. A method, for facilitating synchronous adaptive radio selection, in a mobile telecommunications network, using a reference test station, comprising:

monitoring, at the reference test station, in a first monitoring act, signals emanating from a plurality of end user devices and a base station of the mobile telecommunications network, wherein:
   the signals are generated by respective synchronous adaptive radio selection agent modules in the end user devices and emanated for facilitating the synchronous adaptive radio selection; and
   the base station has a synchronous adaptive radio selection agent module for acting as a monitoring sensory agent;

collecting, at the reference test station, data resulting from the first monitoring act to create collected data;

analyzing, in an analysis act, the collected data;

identifying, in an identification act, based on results of the analysis act, a hot zone in the mobile telecommunications network;

monitoring, at the reference test station, in a second monitoring act, for network updates from the base station of the mobile telecommunications network, the network updates including new security updates and network administration policies;

referencing, at the reference test station, input from a central clock source;

generating, at the reference test station, channel control information for sending to the end user devices and to the base station, wherein the channel control information (A) is based on results of the first monitoring act, (B) is based on results of the second monitoring act, (C) is based on results of the identification act, (D) is based on the input from the central clock source, and (E) includes (i) timing information including a synchronization code based on the input from the central clock source, (ii) a test station identifier corresponding particularly to said reference test station, (iii) interference information concerning channels, (iv) network level policy information, (v) security directive information, (vi) dynamic global network policy information including a policy actuated by an administration controller of the mobile telecommunications network, and (vii) channel route optimization information including cost model data, relating to frequency, for use by the end user devices in choosing a transmit frequency based on cost; and transmitting, from the reference test station, channel control information to the end user devices and to the base station;

wherein:
   the transmitting is accomplished by way of a communication channel, of the mobile telecommunications network, allocated for transfer of channel control information in connection with facilitating synchronous adaptive radio selection in the mobile telecommunications network; and
   the end user devices and the base station are configured to receive and process the channel control information by having the synchronous adaptive radio selection agent modules.

2. The method as recited in claim 1, wherein the input from the central clock source is received from the base station.

3. The method as recited in claim 1, wherein said communication channel allocated for transfer of the channel control information is a predetermined orthogonal frequency division multiplex/time division duplex channel.

4. The method as recited in claim 1, wherein the transmitting occurs at regular intervals of time.

5. The method as recited in claim 1, wherein:
the reference test station is a first reference test station;
the first reference test station is one of a redundant, collocated, pair of reference test stations including the first reference test station and a second reference test station; and
the second reference test station independently performs acts of the method, including:
   the first monitoring act;
   the collecting;
   the analyzing;
   the identifying;
   the second monitoring act;
   the referencing; and
   the transmitting.

6. The method as recited in claim 1, wherein:
each of the end user devices has a respective clock; and
each of the end user devices periodically seeks the channel control information for use by each of the end user devices in performing functions including (a) synchronizing the respective clock according to said timing information, (b) adopting a new network level policy indicated by the network level policy information, (c) adopting security measures indicated by the security directive information, (d) selecting amongst channel route alternatives, and (e) selecting amongst frequency options.

7. The method as recited in claim 1, wherein a particular end user device of the end user devices has an altimeter for use in connection with facilitating the synchronous adaptive radio selection.

8. The method as recited in claim 1, wherein each of the end user devices periodically seeks the channel control information for use by each of the end user devices in determining whether to use a licensed or an unlicensed radio frequency spectrum.

9. The method as recited in claim 1, wherein the network administration policies are from a network administration controller of the mobile telecommunications network.

10. The method as recited in claim 1, wherein each of the end user devices periodically seeks the channel control information for use by each of the end user devices in placing a call.

11. The method as recited in claim 1, wherein the transmitting is performed to facilitate channel selection for a particular end user device, of the end user devices, based on the channel control information, the channel selection also being based on a bandwidth requirement of an application of the particular end user device.

12. A method, for facilitating synchronous adaptive radio selection, in a mobile communications network, using an end user device having a synchronous adaptive radio selection agent module, comprising:

outputting, from the end user device, signals generated using the synchronous adaptive radio selection agent module of the end user device, wherein the signals are generated and outputted for receipt by a reference test station for the facilitating synchronous adaptive radio selection;

receiving, at the end user device, using the synchronous adaptive radio selection agent module, channel control information from a reference test station; and selecting, at the end user device, using the synchronous adaptive radio selection agent module, a radio frequency, for use in connection with an application of the end user device, based on (A) the channel control information and (B) a bandwidth requirement of the application;

wherein the channel control information:
is based on said signals;
is based on an identification by the reference test station of a hot zone; and
includes (i) timing information including a synchronization code, (ii) a test station identifier corresponding particularly to said reference test station from which the channel control information is received, (iii) interference information concerning channels, (iv) network level policy information, (v) security directive information, (vi) dynamic global network policy information, and (vii) channel route optimization information including cost model data relating to frequency; and wherein selecting the radio frequency includes the end user device selecting the radio frequency based on the cost model data.

13. The method as recited in claim 12, further comprising adapting, at the end user device, an internal reference clock of the end user device to synchronize the end user device with the timing information received in channel control information from the reference test station.

14. The method as recited in claim 12, wherein:
the end user device includes an altimeter, and
the end user device uses altitude data obtained using the altimeter in facilitating the synchronous adaptive radio selection.

15. The method as recited in claim 12, wherein the synchronous adaptive radio selection agent module of the end user device causes the end user device to initiate, at power up of the end user device, registration to a synchronous adaptive radio selection agent module of a base station proximate the end user device.

16. The method as recited in claim 12, wherein the bandwidth requirement of the application of the end user device is categorized at the end user device as being either high, intermediate, or low.

17. A method, for facilitating synchronous adaptive radio selection, in a mobile communications network, using a base station having a synchronous adaptive radio selection agent module, comprising:

registering, at the base station, using the synchronous adaptive radio selection agent module of the base station, a plurality of end user devices to the base station, each of the end user devices including a synchronous adaptive radio selection agent module causing each of the end user devices to initiate registration to the base station;

receiving, from a reference test station, at the base station, using the synchronous adaptive radio selection agent module of the base station, channel control information;

collecting network information;

providing, to the reference test station, central clock source input; and optimizing channel route selection for a particular end user device, of the plurality of the end user devices, based on (i) a bandwidth requirement of an application of the particular end user device and (ii) said channel control information;

wherein the channel control information:
is based on signals received from the plurality of the end user devices; and
includes (i) timing information including a synchronization code based on said central clock source input, (ii) a test station identifier corresponding particularly to said reference test station, (iii) interference information concerning channels, (iv) network level policy information, (v) security directive information, (vi) dynamic global network policy information, and (vii) channel route optimization information including cost model data for use in choosing a frequency for the particular end user device.

18. The method as recited in claim 17, wherein the synchronous adaptive radio selection agent module of each of the end user devices causes each of the end user devices to initiate registration to the base station at power up of each of the end user devices.

19. The method as recited in claim 17, wherein optimizing channel route selection for the particular end user device includes selecting a radio frequency spectrum being an unlicensed spectrum in response to identifying a hot zone in the mobile communications network proximate to the base station.

20. The method as recited in claim 17, wherein:
the base station has an altimeter; and
optimizing channel route selection for the particular end user device is based on altitude data obtained using the altimeter.

21. The method as recited in claim 17, wherein the bandwidth requirement of the application of the particular end user device is categorized at the base station as being either high, intermediate, or low.

* * * * *